(12) United States Patent
Ilyadis

(10) Patent No.: US 8,327,143 B2
(45) Date of Patent: Dec. 4, 2012

(54) TECHNIQUES TO PROVIDE ACCESS POINT AUTHENTICATION FOR WIRELESS NETWORK

(75) Inventor: Nicholas Ilyadis, Nashua, NH (US)

(73) Assignee: Broadcom Corporation, Irvine, CA (US)

( * ) Notice: Subject to any disclaimer, the term of this patent is extended or adjusted under 35 U.S.C. 154(b) by 893 days.

(21) Appl. No.: 12/185,659

(22) Filed: Aug. 4, 2008

(65) Prior Publication Data
US 2010/0031029 A1 Feb. 4, 2010

(51) Int. Cl.
*H04L 9/32* (2006.01)
(52) U.S. Cl. ......... 713/170; 713/156; 380/268; 380/270
(58) Field of Classification Search .................. 713/156, 713/170
See application file for complete search history.

(56) References Cited

U.S. PATENT DOCUMENTS

| | | | |
|---|---|---|---|
| 7,266,685 B1 * | 9/2007 | Meandzija et al. | 713/156 |
| 7,317,914 B2 * | 1/2008 | Adya et al. | 455/421 |
| 7,373,508 B1 * | 5/2008 | Meier et al. | 713/168 |
| 7,620,016 B2 * | 11/2009 | Sayers | 370/331 |
| 7,787,865 B2 * | 8/2010 | Willey et al. | 455/411 |
| 2004/0023642 A1 * | 2/2004 | Tezuka | 455/411 |
| 2005/0010680 A1 * | 1/2005 | Zick et al. | 709/237 |
| 2005/0021956 A1 * | 1/2005 | Genty et al. | 713/170 |
| 2006/0115081 A1 * | 6/2006 | Buer et al. | 380/44 |
| 2007/0124584 A1 * | 5/2007 | Gupta | 713/168 |
| 2007/0180225 A1 * | 8/2007 | Schmidt | 713/152 |
| 2007/0180229 A1 * | 8/2007 | Salowey et al. | 713/156 |
| 2008/0080708 A1 * | 4/2008 | McAlister et al. | 380/44 |
| 2008/0183629 A1 * | 7/2008 | Kausik | 705/71 |

OTHER PUBLICATIONS

"Wi-Phishing" and "Evil Twins" at Hotspots, *AirDefense White Paper*, (2005),7.
"BroadSAFE Enhanced IP Phone Networks", *Secure VoIP Using the Broadcom BCM11xx IP Phone Technology, White paper*, (Sep. 2005).
Craiger, J. Philip "802.11, 802.1x and Wireless Security", *CIAC Security Essentials Certification (GSEC) Practical Assignment, Version 1.4*, (Jun. 23, 2002), 16.
Jim, Burns "How 802.1x Authentication Works", *(Computerworld) Benefits of WLAN*, (Apr. 3, 2003),2.
"Securing Home Wi-Fi(r) Networks: A Simple Solution Can Save Your Identity", *White Paper, Wireless-WP200-x*, (May 18, 2005).

* cited by examiner

*Primary Examiner* — Christopher Brown
*Assistant Examiner* — Fahimeh Mohammadi
(74) *Attorney, Agent, or Firm* — Brake Hughes Bellermann LLP

(57) ABSTRACT

According to an example embodiment, an apparatus may include a client device including a processor and memory. The client device may be configured to obtain, via a secure communication, a certificate identifying a publically accessible wireless access point (AP) and a public key for the AP, the AP being publically accessible. The client (or client device) may be configured to generate a challenge, send the challenge to the AP, wherein the AP has a private key securely stored in a hardware security module of the AP. The private key may correspond to the public key for the AP. The client may be configured to receive a response from the AP, the response being generated by the AP based on the challenge and the private key for the AP, and authenticate the AP based on the response.

20 Claims, 4 Drawing Sheets

TECHNIQUES TO PROVIDE ACCESS POINT AUTHENTICATION FOR WIRELESS NETWORK

BACKGROUND

The large numbers of wireless public hotspots at coffee shops, restaurants, hotels, airports and other locations offering wireless connectivity have provided traveling workers and others convenient options for connecting to the Internet or the corporate network. Unfortunately, public hotspots often present security risks for users or clients.

For example, an "Evil Twin" attack can occur when a hacker impersonates a legitimate, commercial hotspot and an unsuspecting user connects to the "Evil Twin" wireless access point (AP). The Evil Twin hotspot may look identical to a legitimate public network AP that a user may log in to every day. For example, a soft AP may be created on a laptop. The soft AP may broadcast a service set identifier (SSID) that lets other wireless devices know that the AP is available. The hacker can even give the AP a legitimate name that indicates service from a common or well known wireless service provider. This may even cause a wireless device or client to automatically connect to the AP. Once a user has connected to the AP, the hacker may present fake sign-in pages, fake credit card payment pages, etc., that lure the unsuspecting user to input confidential information, such as credit card numbers, user names and passwords, and the like.

A number of solutions have been proposed to improve wireless security. These usually involve use of encryption between client and AP, and/or an AP authenticating the wireless client, or use of an authentication server. For example, merely authenticating a client does not protect the client from an Evil Twin situation. Likewise, use of an authentication server to authenticate a client does not protect the client, and requires the client to communicate directly through the AP. Thus, it may be desirable to provide improved techniques to protect wireless clients from fraudulent APs or Evil Twin type of situations where a hacker may be impersonating a legitimate wireless AP/hotspot.

SUMMARY

Various example embodiments are disclosed relating to Access Point (AP) authentication.

According to an example embodiment, a method may be provided for a client to authenticate a wireless access point. The method may include obtaining, via a secure communication, a certificate identifying a wireless access point (AP) and a public key for the AP, generating a challenge, sending the challenge to the AP, wherein the AP has a private key securely stored in a hardware security module of the AP, wherein the private key corresponds to the public key for the AP, the AP being a publically accessible AP, receiving a response from the AP, the response being generated by the AP based on the challenge and the private key for the AP, and authenticating the AP based on the response.

According to another example embodiment, a method may be provided for a client to authenticate a wireless access point. The method may include obtaining, via a secure communication, a certificate identifying a wireless access point (AP) and a public key for the AP, generating a challenge by encrypting a random number based on the public key for the AP, sending the challenge to the AP, wherein the AP has a private key securely stored in a hardware security module of the AP, wherein the private key corresponds to the public key for the AP, the AP being publically accessible, receiving a response from the AP, the response being generated by the AP based on the challenge and the private key for the AP, and comparing the received response to the random number used in generating the challenge, wherein authentication of the AP is established based on a match between the random number and the received response.

According to another example embodiment, an apparatus may include a client device including a processor and memory. The client device may be configured to: obtain, via a secure communication, a certificate identifying a publically accessible wireless access point (AP) and a public key for the AP, the AP being open and publically accessible, generate a challenge, send the challenge to the AP, wherein the AP has a private key securely stored in a hardware security module of the AP, wherein the private key corresponds to the public key for the AP, receive a response from the AP, the response being generated by the AP based on the challenge and the private key for the AP, and authenticate the AP based on the response.

DETAILED DESCRIPTION

Figure 1:
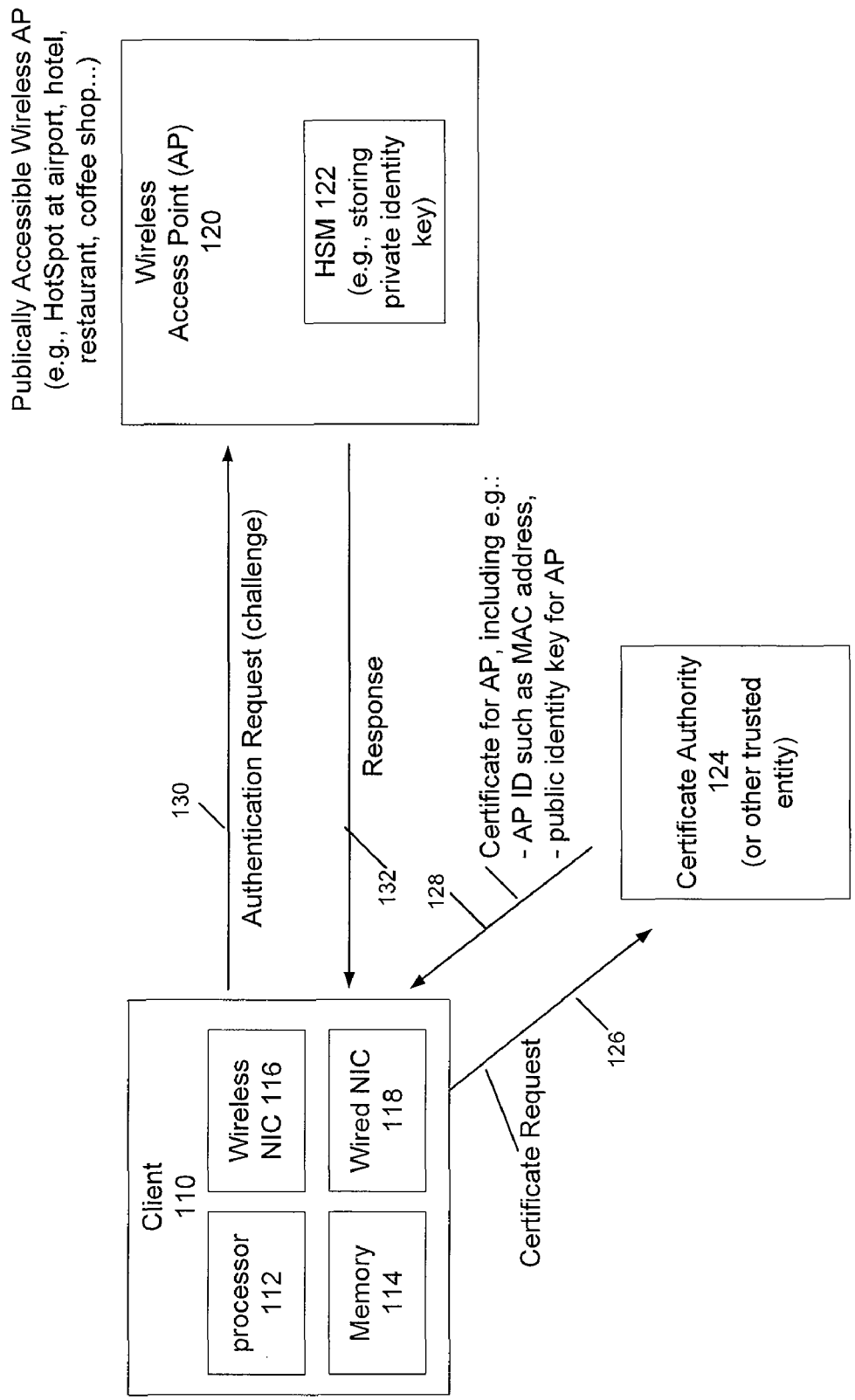
FIG. 1 is a block diagram of a system according to an example embodiment.

FIG. 1 is a block diagram of a system according to an example embodiment. The system illustrated in FIG. 1 may include a client (which may be referred to as a client device) 110, a certificate authority (CA) 124, and a wireless access point (AP) 120. Client 110 may be coupled to (or otherwise communicate with) CA 124 or other trusted entity to obtain a certificate for one or more wireless Access Points (APs). The certificates may be stored in memory (114) or disk for later use. Later, for example, after a user has travelled or is located at a public hotspot, client 110 may connect to the Internet or other network via wireless AP 120, which may be a public (or publically accessible) AP. However, prior to connecting via the public AP 120, client 110 may authenticate wireless AP 120 based on the certificate obtained from the CA 124.

A publically accessible AP, for example, typically does not use techniques to exclude the general public from using the AP, such as a username and password (other than possibly requiring payment). Of course, in many cases, publically accessible APs (or public APs) may require a payment, or proof of subscription, from a user before connecting the user to the Internet, but the publically accessible AP typically does not exclude users based on their identity (or failure to provide their identity). Thus, any wireless user or wireless client may typically be able to connect to the public AP, assuming the user can pay for the service (or similarly provide proof of service subscription or the like).

Thus, according to an example embodiment, when the user connects to the AP at a coffee shop or other public hotspot via the client 110, the client may first authenticate the AP 120, based on the previously stored certificate. After the AP has been authenticated, the user may typically provide a payment via a credit card, debit card, (or other payment source), or otherwise provide proof of a service subscription, or the like. The client 110 may then receive wireless service (e.g., Internet service) from the AP 120, for example.

Client may provide payment information to the AP 120 after the client has authenticated the AP 120. For example, client 110 may send a user's confidential credit card information, or confidential service subscription information (e.g., verifying a valid wireless service subscription) to the AP 120 after the AP has been authenticated. In this manner, by client 110 authenticating the AP 120 before disclosing confidential information (e.g., credit card numbers) to AP 120, security risks for the client may be significantly decreased.

According to an example embodiment, client 110 may be any type of computing device, such as, for example, a laptop, computer, handheld device, PDA (personal digital assistant), cell phone, wireless communications device, an IEEE 802.11 WLAN (Wireless Local Area Network) phone, a IEEE 802.16 WiMAX (Wireless Metropolitan Area Network) device, or other computing device or networking device. Client 110 may include, for example, a processor 112 for controlling operation of client 110 (which may include a programmable processor for executing software and/or firmware), hardware and/or software or other logic, memory 114 (e.g., non-volatile memory or RAM) for storing information, and one or more network interface controllers (NIC), such as a wireless NIC 116 and a wired NIC 118. Wired NIC 118 may include, for example, an Ethernet NIC (or transceiver) for transmitting information over an Ethernet cable, or other type of wired networking interface. Wireless NIC 116 may include a WLAN NIC or WLAN transceiver (transmitter and receiver) for transmitting and receiving information via a WLAN wireless link, and/or a WiMAX NIC or WiMAX transceiver (transmitter and receiver) for transmitting and receiving information via a WiMAX wireless link, or other wireless NIC.

While the term AP or access point is used herein for purposes of explanation or by way of example, the term "AP" or "access point" or wireless AP 120 (or other APs) may include any type of infrastructure node, such as an AP, a base station (BS), a Node B, a relay node or relay station, etc. These infrastructure nodes (e.g., including AP 120), as well as client 110, may be compliant with, or otherwise may communicate in accordance with one or more wired standards such as IEEE 802.3 Ethernet related standards or specifications, and/or one or more wireless standards or wireless specifications, such as, for example, IEEE 802.16 Wireless Metropolitan Area Network (WiMAX) specifications, IEEE 802.11 Wireless Local Area Network (WLAN) specifications, Long Term Evolution (LTE) specifications, or other wireless communications specifications or standards.

Wireless AP 120 may be provided, for example, as a public (or publically accessible) hotspot, such as at an airport, coffee shop, restaurant, hotel, etc. In an example embodiment, the AP 120 may at least initially be untrusted by client 110. The AP 120, at least in some embodiments, may be provided as an open or non-secure AP where, e.g., encryption or tunneling is not used in at least some of the communication between AP and a client 110. In some cases, the AP may be completely open or non-secure, as the AP may not use any encryption even after the client has authenticated the AP. In another example embodiment, encryption may be used by AP 120 after a client authenticates the AP and the client obtains a data transmission key from the AP 120, for example, for encryption of transmitted data and decryption of received data, for example.

According to an example embodiment, wireless AP 120 may include a hardware security module (HSM) 122 to securely store one or more keys, such as private keys for the AP. For example, HSM 122 may securely store a private identity key that may be used to authenticate the AP 120. Other keys may also be securely stored in the HSM 122. The HSM 122 may, for example, provide a boundary outside of which the keys (that are stored in the HSM) are not exposed in the clear, but may only be exposed outside of the HSM in an encrypted format. Thus, the private keys may be encrypted and decrypted within HSM 122. In an example embodiment, only public keys may be exposed outside of the HSM 122 in the clear (non-encrypted). In this manner, by using a hardware security module 122 to store private keys for the AP 120, this may prevent (or at least significantly decrease the risk of) tampering or theft of the AP's private keys by a hacker, etc.

Certificate authority (CA) 124, which may also be referred to as a certification authority or a trusted entity, may be a trusted entity or trusted organization that may accept certificate applications from entities, authenticates applications, issues certificates, maintains status information about certificates, and performs other tasks related to certificates. CA 124 may be implemented, for example, using a computer or server (having a processor, memory, network interface controller(s), etc.). For example, an entity may submit an application to CA 124 to register for a certificate or multiple certificates. For example, a wireless service provider may submit applications to register for a certificate for each of multiple wireless APs (or an AP itself may submit an application to register for a certificate), where each AP may be uniquely identified by an AP ID, such as a MAC (Media Access Control) address, or other address, a unique serial number, or other identifier for the AP.

In addition to receiving an application for each wireless AP, CA 124 may also receive (or may generate) a public key/private key pair for each AP. In an example embodiment, this key pair may be used to validate or confirm an identity (or for identification) of the AP (also known as authentication), and thus, may be referred to an identity key pair, and may include a public identity key and private identity key, for example. The CA 124 may generate the key pair for the AP, or may receive one or both keys of the key pair via secure communication from the wireless service provider, from the AP itself or from other entity, as examples.

CA 124 may confirm the validity of the subject's (e.g., AP's) identity, and may then bind the public key/private key pair to its identity (or bind the public key to the subject's identity). For example, after validating or confirming information relating to an AP 120, the CA 124 may bind a wireless AP's MAC address to the public identity key for the AP. Later, upon request, the CA 124 may issue a certificate (e.g., to client 110 or other user or computing device) that identifies the wireless AP (e.g., provides the MAC address of the AP), the public key for the AP, and may include other information such as the encryption algorithm used for the key.

In an example embodiment, when a client 110 is attempting to connect to a network or to the Internet via a public AP 120 or hotspot, the client 110 may attempt to authenticate the AP via the use of an authentication server or other entity. However, when located at an airport or coffee shop or other public location, the only way to access the authentication server may be through the untrusted public AP 120. Thus, in such a situation, connecting to the public AP may be a prerequisite before the client can communicate with the authentication server (or other trusted entity) to authenticate the AP. Thus, this may be problematic since, according to an example embodiment, the client should authenticate the AP 120 before the client connects to the AP or provides confidential information to the AP 120. According to an example embodiment, client 110 may authenticate AP 120 based on a certificate for the AP that was previously obtained and stored from a reliable source, such as a Certificate Authority.

Overall operation of the system shown in FIG. 1 will now be described, where the client 110 may use a certificate obtained from a trusted entity to authenticate AP 120. Therefore, according to an example embodiment, before client has travelled to a public location, client 110 may send (or transmit) a certificate request 126 via line 126 to CA 124 to request a certificate for one or more wireless APs, for example. Client 110 may request a certificate for an AP (or group of APs) in a number of different ways. For example, client 110 may send a request for a specific AP (e.g., identified or selected based on address of a coffee shop), or a request for certificates for a group of APs. The client may select a group of APs by selecting or indicating, for example, all APs in Seattle that provide connectivity by a specific service provider or provided at a specific location. Or example, client 110 may request one or more, or even all, certificates for APs that provide connectivity within the US for a specific hotel, or for APs of a service provider at all airports in the US or within the state of California. For example, a user or client 110 may use a web page to specify or request certificates from one or more (or even all) wireless APs at a specific coffee shop such as Starbucks, within a specific airport, provided by a specific service provider, etc. These are merely some examples and the disclosure is not limited thereto.

In response to the certificate request via line 126, the CA 124 may send the client 110, via line 128, a certificate for one or more wireless APs. The certificate may provide a way for the client 110 to authenticate the AP 120. The certificate may bind (or indicate an association between) the AP's public key and the AP's identity, for example. An example certificate may include, for example, the issuer name (or name of the issuing CA), a validity period indicating a period of time for which the certificate remains valid (after which the AP may be using a different key, for example), a subject name (e.g., "hotspot or AP from service provider Y at Starbucks at address Z"), a subject unique identifier that may uniquely identify the AP (such as a MAC address, a serial number or other unique identifier), public key material for the AP (e.g., public key and parameters such as an encryption algorithm used for the key), and/or other fields. Thus, as shown in FIG. 1, the certificate for an AP (or for each AP where multiple certificates are requested) provided via line 128 may include, for example, an AP identifier (or AP ID), which may include a name of the AP or a unique identifier for the AP (e.g., MAC address for the AP), and a public key, such as a public identity key that may be used to identify or authenticate the AP. These are merely some example certificates. Other parameters or fields may be provided in a certificate.

In an example embodiment, the request via line 126 and certificate provided via line 128 may be sent via secure communication, such as via encrypted messages, a tunnel or other secure mechanism for communication. The certificate may be encrypted (or signed) by CA 124 using a private key (which may also be referred to as a key encryption key). Client 110 may decrypt the certificate from CA 124 using a public key associated with CA 124, for example.

The client 110 may then travel to a hotspot or publically accessible AP, for example, such as AP 120. Prior to connecting to AP 120 or providing confidential information to AP 120, the client 110 may authenticate the AP 120 based on the previously obtained certificate for the AP received from the CA 124.

Therefore, client 110 may generate a challenge. The challenge may be generated by, for example, encrypting a random number using the public key associated with AP 120. Client 110 may then send an authentication request via line 130 to the AP 120, including the challenge. AP 120 may receive the authentication request including the challenge, and may decrypt the challenge using the AP's private identity key, which corresponds to the public key that was used to generate the challenge. By decrypting the challenge using a private key that corresponds to the public key that was used to encrypt the random number, the wireless AP 120 may recover the original random number used by the client 110. AP 120 may then send a response to client 110 via line 130. The response may include the random number obtained by the AP 120 decrypting the challenge using the AP's private key. At the client 110, the number received in the response from the AP 120 is compared to the original random number used by the client 110 to generate the challenge. If the number received from the AP 120 in the response matches the original random number used by the client 110, this proves that the AP 120 is in possession of the private key that corresponds to the AP's public identity key. In this manner, the client 110 may authenticate the AP 120.

After authenticating AP 120, client 110 may connect with AP 120, may provide confidential information, and access networks or the Internet via AP 120. If the number in the response received via line 132 from AP 120 does not match the original random number used by client 110 to generate the challenge, then the AP 120 is not authenticated, and client 110 does not typically connect or does not provide confidential information to AP 120, for example. In this manner, security for the client 110 may be improved. For example, by authenticating the AP 120, the client 110 may be protected against an Evil Twin type of attack where a hacker may use a laptop or other device to impersonate a legitimate AP for the purpose of obtaining confidential information, etc.

In another example embodiment, the client 110 may transmit the random number (unencrypted) as the challenge to the AP 120 via line 130. The AP 120 may then encrypt the random number using its private identity key, and send the encrypted number (as the response) to the client via line 132. The client 110 may then decrypt the received response using the AP's public identity key. If the recovered number (after decrypting the response) matches the original random number sent as the challenge to the AP, then this proves that the AP 120 is in possession of the AP's private identity key corresponding to the AP's public identity key. Thus, this may provide an alternate technique for client 110 to authenticate the AP 120.

In addition, in another example embodiment, the AP 120 may also authenticate the client 110, e.g., by sending a challenge to the client, and authenticating the client based on the response received from the client 110. AP 120 may alternatively use an authentication server (not shown) for this purpose, e.g., where the challenge may be generated and sent to the client 110 by the authentication server, and the response from client 110 may be compared by the authentication server to an original random number used to generate the challenge, for example. In this manner, mutual authentication may be provided between client 110 and AP 120. Although mutual authentication is not required.

Figure 2:
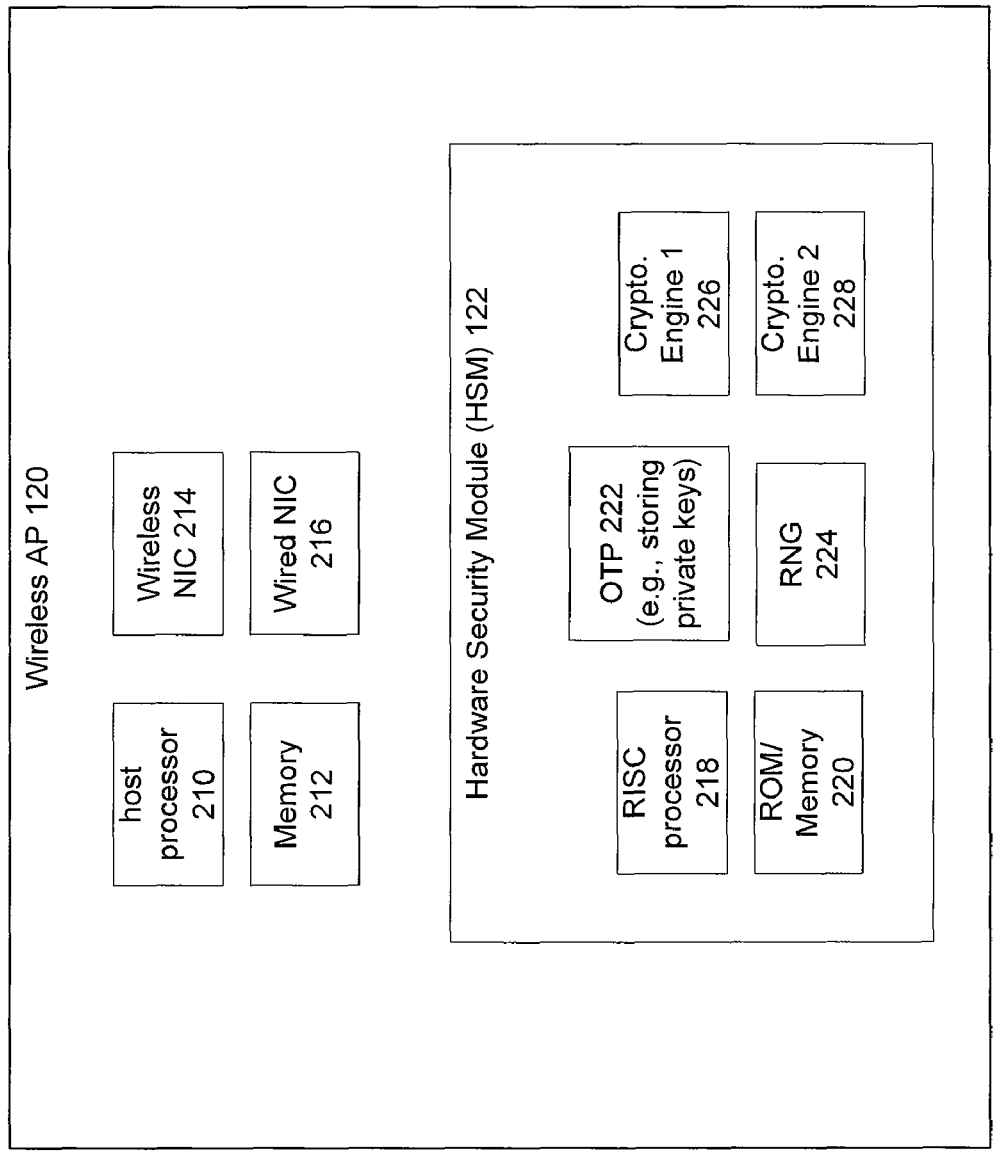
FIG. 2 is a block diagram illustrating a wireless access point (AP) according to an example embodiment.

FIG. 2 is a block diagram illustrating a wireless access point (AP) according to an example embodiment. Referring to FIG. 2, wireless AP 120 may include a host processor 210 to execute software or microcode provided in firmware and provide overall control for AP 120, a memory 212 for storing information, a wireless NIC (network interface controller or wireless transmitter/receiver) 214, and a wired NIC 216.

As described above, wireless AP 120 may also include a hardware security module (HSM) 122 for securely storing keys for the AP 120. HSM 122 may include, for example, a RISC (reduced instruction set computer) processor 218 for providing overall control of the HSM 122, a ROM (read only memory) or RAM (random access memory) 220. HSM 122 may also include a one time programmable (OTP) memory 222 which may store one or more keys (e.g., private keys) for the AP 120. In an example embodiment, the private keys stored in the OTP 222 of the HSM 122 are not exposed (or accessible) outside of HSM 122. This may decrease the opportunity for a hacker to steal private keys for an AP and then impersonate a legitimate AP at a public hotspot or other location.

A random number generator (RNG) 224 may generate random numbers. The HSM 122 may include one or more cryptographic engines (or cryptographic accelerators), such as, for example, cryptographic engine 1 226 and cryptographic engine 2 228, to perform cryptographic processing (e.g., encrypting, decrypting, performing hash functions and/or other cryptographic or security related processing) and may allow such cryptographic processing to be off-loaded from processor 218.

Figure 3:
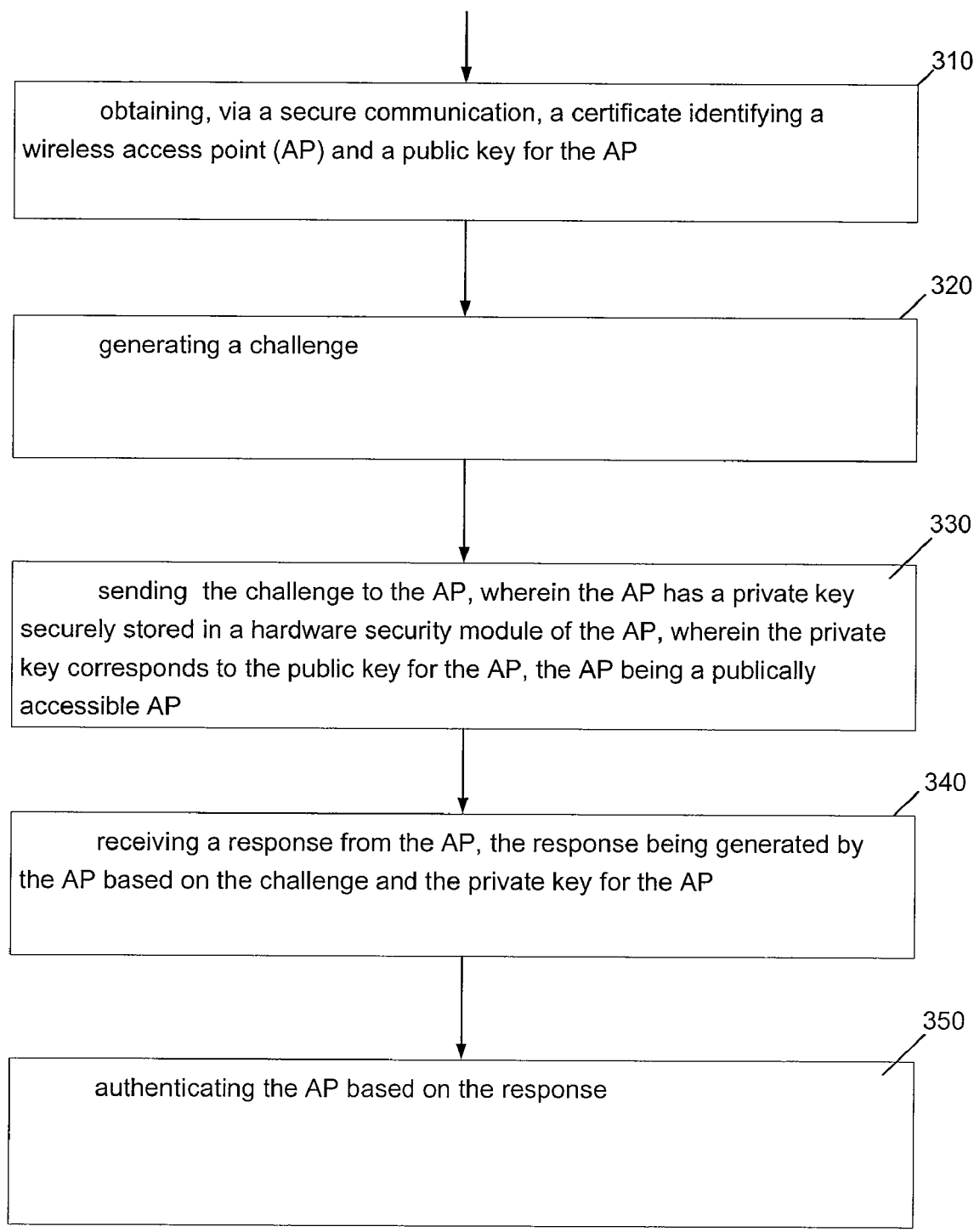
FIG. 3 is a flow chart illustrating operation of a client (or client device) according to an example embodiment.

FIG. 3 is a flow chart illustrating operation of a client (or client device) according to an example embodiment. According to an example embodiment, the flow chart illustrated in FIG. 3 may, for example, illustrate a method for a client to authenticate a wireless access point. Operation 310 may include obtaining, via a secure communication, a certificate identifying a wireless access point (AP) and a public key for the AP. Operation 320 may include generating a challenge. Operation 330 may include sending the challenge to the AP, wherein the AP has a private key securely stored in a hardware security module of the AP, wherein the private key corresponds to the public key for the AP, the AP being a publically accessible AP. Operation 340 may include receiving a response from the AP, the response being generated by the AP based on the challenge and the private key for the AP. And, operation 350 may include authenticating the AP based on the response.

According to an example embodiment, operation 310 may include receiving, via a secure communication from a certificate authority or other trusted entity, a certificate for each of a plurality of publically accessible wireless APs, each certificate identifying one of the wireless APs and a public key for the AP.

According to another example embodiment, operation 310 may include receiving, via a secure communication from a certificate authority or other trusted entity, a certificate for each of a plurality of publically accessible wireless APs provided by a common wireless service provider, each certificate identifying a MAC address of one of the wireless APs and a public key for the AP.

According to another example embodiment, in the method of FIG. 3, the challenge may include a random number and the response may include the random number that has been encrypted based on the AP's private key.

According to another example embodiment, in the method of FIG. 3, the challenge may include a random number that has been encrypted based on the AP's public key and the response may include the random number that has been obtained by the AP by decrypting the challenge based on the AP's private key.

According to an example embodiment, operation 320 may include determining a random number, the challenge being the random number.

According to an example embodiment, operation 320 may include determining a random number, and encrypting the random number based on the AP's public key to generate the challenge.

According to an example embodiment, the method of FIG. 3 may further include the AP authenticating the client.

Figure 4:
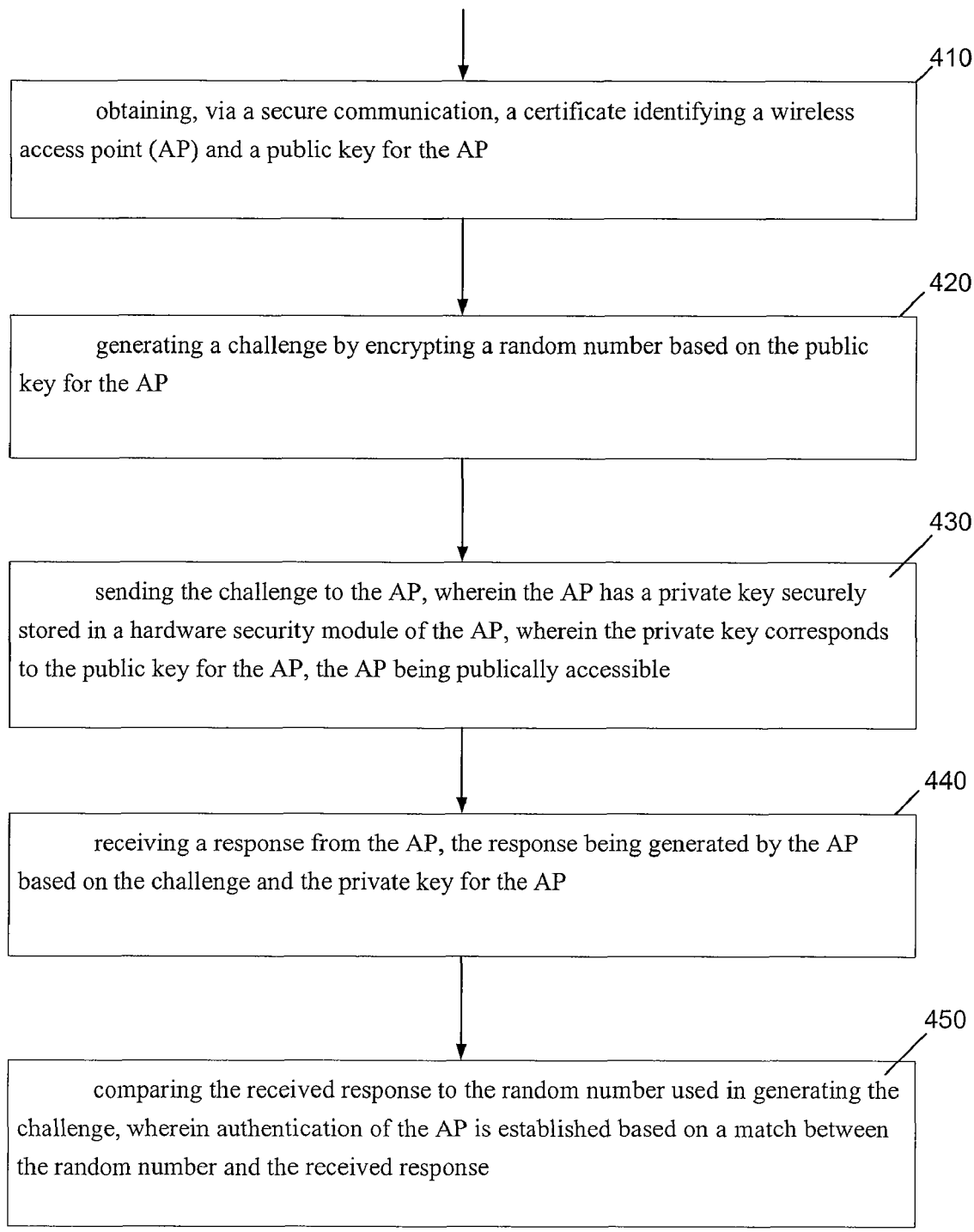
FIG. 4 is a flow chart illustrating operation of a client (or client device) according to an example embodiment.

FIG. 4 is a flow chart illustrating operation of a client (or client device) according to an example embodiment. According to an example embodiment, the flow chart illustrated in FIG. 4 may, for example, illustrate a method for a client to authenticate a wireless access point (e.g., a public AP or publically accessible AP). Operation 410 may include obtaining, via a secure communication, a certificate identifying a wireless access point (AP) and a public key for the AP. Operation 420 may include generating a challenge by encrypting a random number based on the public key for the AP. Operation 430 may include sending the challenge to the AP, wherein the AP has a private key securely stored in a hardware security module of the AP, wherein the private key corresponds to the public key for the AP. Operation 440 may include receiving a response from the AP, the response being generated by the AP based on the challenge and the private key for the AP. Operation 450 may include comparing the received response to the random number used in generating the challenge, wherein authentication of the AP is established based on a match between the random number and the received response.

According to another example embodiment, an apparatus may include a client device including a processor and memory. The client device may be configured to: obtain, via a secure communication, a certificate identifying a publically accessible wireless access point (AP) and a public key for the AP, e, generate a challenge, send the challenge to the AP, wherein the AP has a private key securely stored in a hardware security module of the AP, wherein the private key corresponds to the public key for the AP, receive a response from the AP, the response being generated by the AP based on the challenge and the private key for the AP, and authenticate the AP based on the response.

In an example embodiment, the apparatus may further include the AP. The AP may include a host processor, and a hardware security module configured to securely store one or more keys including the private key corresponding to the public key for the AP. In an example embodiment, private keys stored in the hardware security module are not exposed (at least not in the clear) outside of the hardware security module.

In an example embodiment, the apparatus may further include the AP, the AP including: a host processor, and a hardware security module including: a processor, a random number generator, a one-time-programmable memory configured to securely store one or more keys including a private identity key corresponding to the AP's public key, and one or more cryptographic engines configured to perform cryptographic processing.

In another example embodiment, the challenge may include a random number and the response may include the random number that has been encrypted based on the AP's private key.

In another example embodiment, the challenge may include a random number that has been encrypted based on the AP's public key and the response may include the random number that has been obtained by the AP by decrypting the challenge based on the AP's private key.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of a client device authenticating a wireless access point comprising:

obtaining, by the client device from a certificate authority, a certificate for each of a plurality of publically accessible wireless access points (APs), each certificate identifying one of the wireless APs and a public key for the AP, wherein a certificate is obtained by the client device for a first AP of the plurality of APs before the client device communicates with the first AP;

generating a challenge by encrypting a random number based on the public key for the first AP;

sending the challenge from the client device to the first AP of the plurality of APs, wherein the first AP has a private key securely stored in a hardware security module of the first AP, wherein the stored private key corresponds to the public key for the first AP;

receiving a response by the client device from the first AP, the response being generated by the first AP based on the challenge and the private key for the first AP; and comparing, by the client device, the received response to the random number used in generating the challenge, wherein authentication of the first AP is established based on a match between the random number and the received response.

2. The method of claim 1 and further comprising the client device providing payment information to the first AP after the client device has authenticated the first AP.

3. The method of claim 1 and further comprising sending confidential credit card information from the client device to the first AP after the first AP has been authenticated.

4. The method of claim 1 wherein the obtaining comprises receiving, by the client device via a secure communication from the certificate authority or other trusted entity, a certificate for each of a plurality of publically accessible non-secure wireless APs provided by a common wireless service provider, each certificate identifying a MAC address of one of the wireless APs and a public key for the AP.

5. The method of claim 1 wherein the challenge comprises a random number and the response comprises the random number that has been encrypted based on the first AP's private key.

6. The method of claim 1 wherein the challenge comprises a random number that has been encrypted by the client device based on the first AP's public key and the response comprises the random number that has been obtained by the first AP by decrypting the challenge based on the first AP's private key.

7. The method of claim 1 and further comprising the first AP authenticating the client.

8. The method of claim 1 and further comprising authenticating, by the client device, the first AP based on a match between the random number and the received response.

9. The method of claim 1 wherein the obtaining comprises obtaining, by the client device from a certificate authority, a certificate for each of a plurality of publically accessible wireless access points (APs) at a specific location.

10. The method of claim 1 wherein the obtaining comprises obtaining, by the client device from a certificate authority, a certificate for each of a plurality of publically accessible wireless access points (APs) for a specific wireless service provider.

11. The method of claim 1 and further comprising sending confidential service subscription information from the client device to the first AP after the first AP has been authenticated.

12. The method of claim 1 and further comprising:
the first AP sending a challenge to the client device;
the first AP receiving a response to the challenge;
authenticating, by the first AP, the client device based on the response received.

13. The method of claim 1 and further comprising:
sending a challenge to the client device from an authentication server;
the authentication server receiving a response to the challenge from the client device;
authenticating, by the authentication server, the client device based on the response received.

14. An apparatus comprising:
a client device including a processor and memory, the client device configured to:
obtain, from a certificate authority, a certificate for each of a plurality of publically accessible wireless access points (APs), each certificate identifying one of the wireless APs and a public key for the AP, wherein a certificate is obtained by the client device for a first AP of the plurality of APs before the client device communicates with the first AP;
generate a challenge by encrypting a random number based on the public key for the first AP;
send the challenge from the client device to the first AP of the plurality of APs, wherein the first AP has a private key securely stored in a hardware security module of the first AP, wherein the stored private key corresponds to the public key for the first AP;
receive a response by the client device from the first AP, the response being generated by the first AP based on the challenge and the private key for the first AP; and
compare, by the client device, the received response to the random number used in generating the challenge, wherein authentication of the first AP is established based on a match between the random number and the received response.

15. The apparatus of claim 14 and further comprising the client device being configured to provide payment information to the first AP after the client device has authenticated the first AP.

16. The apparatus of claim 15 wherein the client device is configured to send confidential credit card information to the first AP after the first AP has been authenticated.

17. The apparatus of claim 14 and further comprising the first AP, the first AP including:
a host processor; and
a hardware security module configured to securely store one or more keys including the private key corresponding to the public key for the first AP.

18. The apparatus of claim 14 and further comprising the first AP, the first AP including:
a host processor; and
a hardware security module including:
a processor;
a random number generator;
a one-time-programmable memory configured to securely store one or more keys including a private identity key corresponding to the first AP's public key, such that the private keys are not exposed outside of the hardware security module;
one or more cryptographic engines configured to perform cryptographic processing.

19. The method of claim 14 wherein the challenge comprises a random number and the response comprises the random number that has been encrypted based on the first AP's private key.

20. The method of claim 14 wherein the challenge comprises a random number that has been encrypted based on the first AP's public key and the response comprises the random number that has been obtained by the first AP by decrypting the challenge based on the first AP's private key.

* * * * *